US010813833B2

(12) United States Patent
Richlowski et al.

(10) Patent No.: US 10,813,833 B2
(45) Date of Patent: Oct. 27, 2020

(54) HOLDING FIXTURE AND METHOD FOR WASHING CONTAINERS

(71) Applicant: West Pharmaceutical Services Deutschland GmbH & Co. KG, Eschweiler (DE)

(72) Inventors: Kolja Richlowski, Aachen (DE); Marcus Borghans, Alsdorf (DE)

(73) Assignee: WEST PHARMACEUTICAL SERVICES DEUTSCHLAND GMBH & CO. KG, Eschweiler (DE)

( * ) Notice: Subject to any disclaimer, the term of this patent is extended or adjusted under 35 U.S.C. 154(b) by 0 days.

(21) Appl. No.: 16/484,999

(22) PCT Filed: Feb. 9, 2018

(86) PCT No.: PCT/US2018/017580
§ 371 (c)(1),
(2) Date: Aug. 9, 2019

(87) PCT Pub. No.: WO2018/148515
PCT Pub. Date: Aug. 16, 2018

(65) Prior Publication Data
US 2019/0358122 A1 Nov. 28, 2019

Related U.S. Application Data

(60) Provisional application No. 62/466,037, filed on Mar. 2, 2017, provisional application No. 62/457,431, filed on Feb. 10, 2017.

(51) Int. Cl.
*A61J 1/00* (2006.01)
*B65G 47/86* (2006.01)
(52) U.S. Cl.
CPC .............. *A61J 1/00* (2013.01); *B65G 47/842* (2013.01); *B65G 2201/0247* (2013.01)

(58) Field of Classification Search
None
See application file for complete search history.

(56) References Cited

U.S. PATENT DOCUMENTS 3,006,455 A * 10/1961 Dudnick ................ B65G 37/00
198/803.7
3,878,874 A * 4/1975 Heckmann .............. B65B 61/00
141/114

(Continued)

FOREIGN PATENT DOCUMENTS

WO 2016037288 A1 3/2016

OTHER PUBLICATIONS

Intl Preliminary Report on Patentability and Written Opinion dated Aug. 13, 2019 in Int'l Application No. PCT/US2018/017580.

(Continued)

*Primary Examiner* — William R Harp
(74) *Attorney, Agent, or Firm* — Panitch Schwarze Belisario & Nadel LLP

(57) ABSTRACT

A holding fixture for a final fill container including a pair of rigid support structures. Each rigid support structure including an inner support having an inner surface with a radius of curvature with respect to a longitudinal axis, the inner surface facing radially inward, a support arm connected to the inner support and extending in an outward direction away from the inner surface, the support arm having a base surface at a terminal end opposite from the inner support; and a compression member attached to the inner surface, the compression member being configured to contact the shell at least when the their longitudinal axes are collinear. The pair of rigid support structures has a closed orientation when the compression member from one of the pair of rigid support structures contacts the compression member from the other (Continued)

one of the pair of rigid support structures forming a combined annular compression member.

20 Claims, 4 Drawing Sheets

(56) References Cited

U.S. PATENT DOCUMENTS

| | | | | |
|---|---|---|---|---|
| 4,095,390 | A * | 6/1978 | Knudsen | B65B 7/168 |
| | | | | 156/379.8 |
| 9,028,752 | B2 * | 5/2015 | Malin | C12M 23/50 |
| | | | | 422/63 |
| 9,506,941 | B2 * | 11/2016 | Malin | C12M 23/50 |
| 9,579,255 | B2 * | 2/2017 | Eliuk | A61J 1/20 |
| 2012/0251275 | A1 | 10/2012 | Malin | |
| 2014/0377038 | A1 | 12/2014 | Malin | |
| 2015/0250678 | A1 | 9/2015 | Eliuk et al. | |

OTHER PUBLICATIONS

Int'l Search Report and Written Opinion dated May 24, 2018 in Int'l Application No. PCT/US2018/017580.

* cited by examiner

HOLDING FIXTURE AND METHOD FOR WASHING CONTAINERS

CROSS-REFERENCE TO RELATED APPLICATIONS

This application is a section 371 a International Application No. PCT/US18/017580, filed Feb. 9, 2018, which was published Aug. 16, 2018 under International Publication No. WO 2018/148515 A1, which claims priority to U.S. Provisional Patent Application No. 62/457,431, filed Feb. 10, 2017, and U.S. Provisional Patent Application No. 62/466,037, filed Mar. 2, 2017, the disclosure of each is incorporated herein by reference in its entirety.

BACKGROUND OF THE INVENTION

The present invention is directed to a device for washing containers in general, and for containers containing a lyophilized powder in particular. More specifically, the present invention is directed to holding fixture for washing pharmaceutical containers containing a lyophilized powder.

It is advantageous for some biological medicaments and other substances intended for injection to be in a freeze-dried powder form free from moisture (lyophilized powder) to improve their stability, which may include reducing or preventing chemical reactions, degradation, aggregation, biological growth, heat sensitivity, etc. As a result, lyophilization increases the shelf life for such substances.

Typically, during lyophilization processing of pharmaceutical medicaments, the medicament is introduced into a vial and a stopper is positioned on the vial in a partially closed orientation or in a position where it can be readily closed, i.e., in a non-airtight manner. The stopper may be initially supplied within a cap containing a button and a cylindrical shell for securing the stopper and button to the vial at a subsequent processing operation or the shell and button may be provided at a later stage in the processing. The vial and stopper are then placed in a vacuum chamber to freeze-dry the medicament. During-freeze drying, moisture is evacuated from the inside of the vial including from the medicament itself. As the moisture evacuates the vial, residue of the medicament may deposit onto the external surface of the vial and stopper, and any additional vial components such as the button and shell.

After the medicament has been lyophilized, the stopper is positioned to form a hermetic seal with the vial and in a subsequent step the shell secures the stopper to the vial, either by crimping if the shell is aluminum or by locking if the shell is plastic.

After the vial is hermetically sealed a washing operation is then performed on the sealed vial (final fill container) to remove deposited residue.

Unintended exposure to the medicament is a concern, as it may pose health risks, such as cytotoxicity among others. Prior art techniques have attempted to address this concern by performing a washing operation on the final fill container and requiring a clinician to handle the final fill container with safety gloves. However, the shell must be secured beforehand to prevent moisture from entering the final fill container. Even if the final fill container is hermetically sealed and secured by a shell, it is desirable to prevent moisture from becoming trapped under the shell and button as it could facilitate the growth of bacteria, among other concerns. Since the aluminum shell and the button are not typically present during the freeze-drying process, the outer surfaces of these components are free from any drug residues and are not washed.

In case the shell and the button are present within the freeze-drying chamber, there is a need in the art for a container holding fixture that reduces or eliminates deposited medicament residue from a final fill container including the shell and button.

BRIEF SUMMARY OF THE INVENTION

In an exemplary embodiment of the present invention, a holding fixture for a final fill container is disclosed. The final fill container may include a vial having a medicament contained inside, the vial may have a first longitudinal axis and a neck at a proximal end of it, the neck proximally terminating at a circumferential lip, the lip defining an opening, the final fill container may further include a stopper positioned at least partially within the vial opening and forming an air-tight seal with the vial, and a cylindrical shell including a button aligned with the first longitudinal axis and circumscribing the lip and the stopper. The holding fixture may include a pair of rigid support structures, each rigid support structure including a first inner support having a first inner surface with a radius of curvature with respect to a second longitudinal axis, the first inner surface facing radially inward, at least one first support arm connected to the first inner support and extending in an outward direction away from the first inner surface, the first support arm having a base surface at a terminal end opposite from the first inner support, and a first compression member attached to the first inner surface, the first compression member being configured to contact the shell at least when the first and second longitudinal axes are collinear. Further, the pair of rigid support structures may have a closed orientation when the first compression member from one of the pair of rigid support structures contacts the first compression member from the other one of the pair of rigid support structures forming a combined first annular compression member.

In some embodiments of the holding fixture, each rigid support structure may include a second inner support having a second inner surface with a radius of curvature with respect to a second longitudinal axis, the second inner surface facing radially inward and being spaced apart axially from the first inner surface; and a second compression member attached to the second inner surface, the second compression members being configured to contact the shell at least when the first and second longitudinal axes are collinear. Further, in the closed orientation, the second compression member from one of the pair of rigid support structures may contact the second compression member from the other one of the pair of rigid support structures forming a combined second annular compression member.

Each rigid support structure may further include at least one second support arm connected to the second inner support and extending in an outward direction away from the second inner surface, the second support arm having a base surface at a terminal end opposite from the second inner support.

Each rigid support structure may include at least one second support arm connected to the second inner support and the first inner support and extending axially therebetween.

The first radius of curvature and the second radius of curvature may be different.

At least one first support arm may include two first support arms extending parallel to one another. The base surface may be configured to be attached to a vial transport device.

The first inner support may have at least one first abutment surface, and the at least first one abutment surface from each of the pair of rigid support structures may be configured to contact one another when the second longitudinal axis from each of the pair of rigid support structures are collinear.

The first compression member from one of the pair of rigid support structures may be configured to contact the first compression member from the other one of the pair of rigid support structures while the at least one first abutment surface from each of the pair of rigid support structures are in contact with each other and while the first at least one abutment surface from each of the pair of rigid support structures are not in contact with each other.

The first inner support may have at least one first abutment surface and the second inner support may have at least one second abutment surface, and the at least one first abutment surface and the at least one second abutment surface from each of the pair of rigid support structures may be configured to contact the respective at least one first abutment surface and the respective at least one second abutment surface when the second longitudinal axis from each of the pair of rigid support structures are collinear.

The first and second compression members from one of the pair of rigid support structures may be configured to contact the respective first and second compression members from the other one of the pair of rigid support structures while the at least one first abutment surface and the at least one second abutment surface from each of the pair of rigid support structures are in contact with the respective at least one first abutment surface and the respective at least one second abutment surface and while the at least one first abutment surface and the at least one second abutment surface from each of the pair of rigid support structures are not in contact with the respective at least one first abutment surface and the respective at least one second abutment surface.

In the closed orientation, the holding fixture may be configured to support the weight of the final fill container.

In the closed orientation, the first annular compression member may be configured to conform with an annular surface of the shell and an annular surface of at least one of the button and vial.

In the closed orientation, the first annular compression member may be configured to conform with an annular surface of the shell and an annular surface of at least one of the button and vial, and the second annular compression member is configured to conform with an annular surface of the shell and an annular surface of at least one of the button and vial which is not conforming to the button or the vial.

In the closed orientation, the holding fixture may be configured to hold a final fill container such that an annular surface of the shell located axially between the first and second annular compression members is unobstructed to permit washing along its entire circumference. In the closed orientation, the holding fixture may be configured to hold a final fill container such that at least a portion of the top is exposed to permit washing thereof.

In the closed orientation, the holding fixture may be configured to hold a final filling container such that at least a portion of the top is exposed to permit washing of it.

In another exemplary embodiment of the present invention, a method for washing a final fill container is disclosed. The final fill container may include a vial having a medicament contained inside, the vial may have a first longitudinal axis and a neck at a proximal end of it, the neck proximally terminating at a circumferential lip, the lip defining an opening, the final fill container may further include a stopper positioned at least partially within the vial opening and forming an air-tight seal with the vial, and a cylindrical shell including a button aligned with the first longitudinal axis and circumscribing the lip and the stopper.

The method may include providing a pair of rigid support structures, each rigid support structure may include a first inner support having a first inner surface with a radius of curvature with respect to a second longitudinal axis, the first inner surface facing radially inward, at least one first support arm connected to the first inner support and extending in an outward direction away from the first inner surface, the first support arm having a base surface at a terminal end opposite from the first inner support, and a first compression member attached to the first inner surface, the first compression member being configured to contact the shell at least when the first and second longitudinal axes are collinear. The method may also include closing the pair of rigid support structures around the final fill container such that the first compression member from one of the pair of rigid support structures contacts the first compression member from the other one of the pair of rigid support structures forming a combined first annular compression member, the first annular compression member conforming with an annular surface of the shell and an annular surface of at least one of the button and vial. Additionally, the method may include transporting, with the holding fixture, the final fill container in front of at least one sprayer, an annular surface of the shell being unobstructed to permit washing along its entire circumference and at least a portion of the top being exposed to permit washing of it.

Each rigid support structure may further include a second inner support having a second inner surface with a radius of curvature with respect to a second longitudinal axis, the second inner surface facing radially inward and being spaced apart axially from the first inner surface, and a second compression member attached to the second inner surface, the second compression members being configured to contact the shell at least when the first and second longitudinal axes are collinear. Moreover, closing the pair of rigid support structures around the final fill container may further include closing the rigid support structures such that the second compression member from one of the pair of rigid support structures contacts the second compression member from the other one of the pair of rigid support structures forming a combined second annular compression member.

During transporting, the annular surface of the shell that is unobstructed to permit washing along its entire circumference may be located axially between the first and second annular compression members.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, the drawings show embodiments which are presently preferred. It should be understood, however, that the invention is not limited to the precise arrangements and instrumentalities shown.

In the drawings.

DETAILED DESCRIPTION OF THE INVENTION

Figure 1:
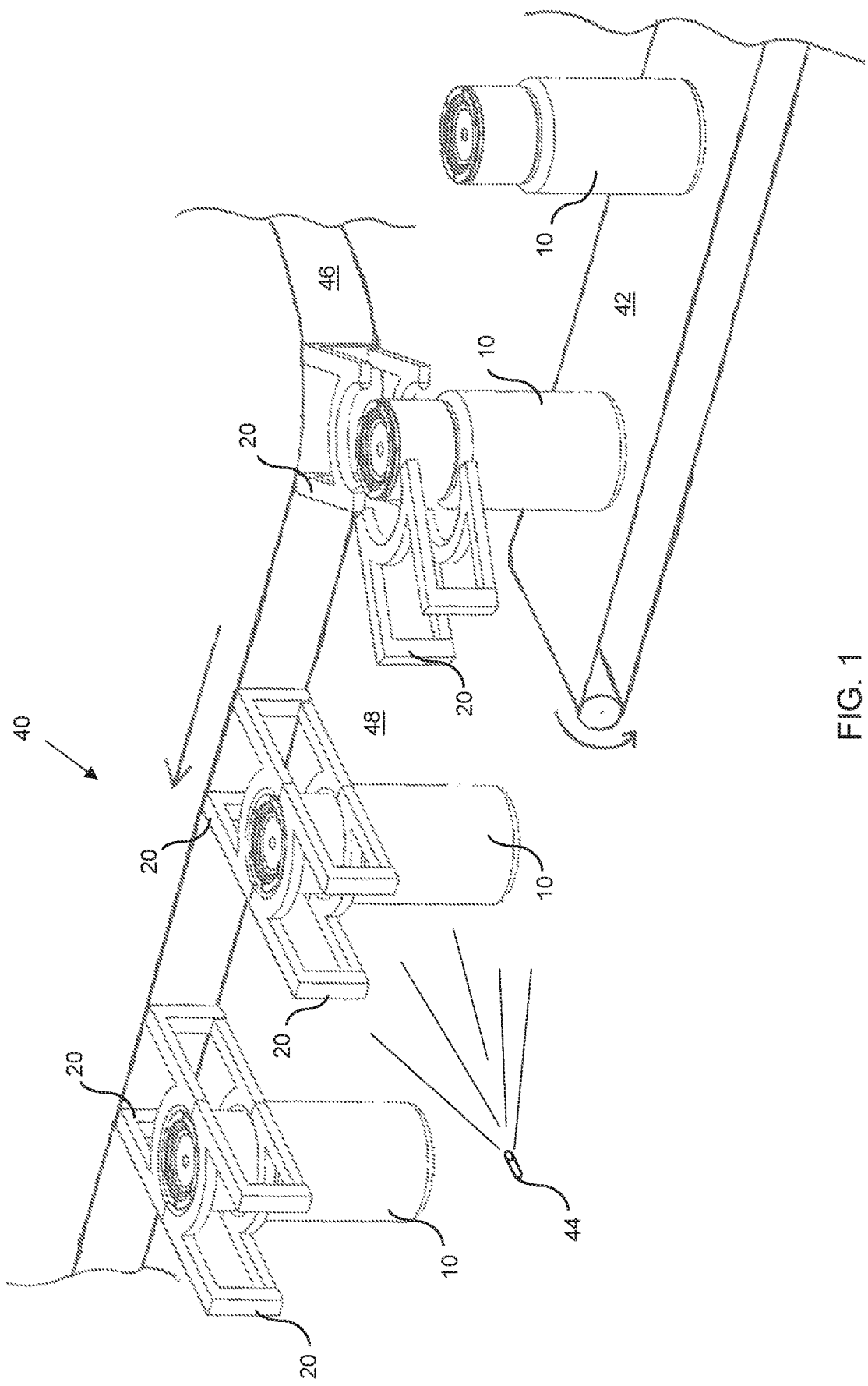
FIG. 1 is a perspective view illustrating an exemplary embodiment of a vial washing system.
Figure 2:
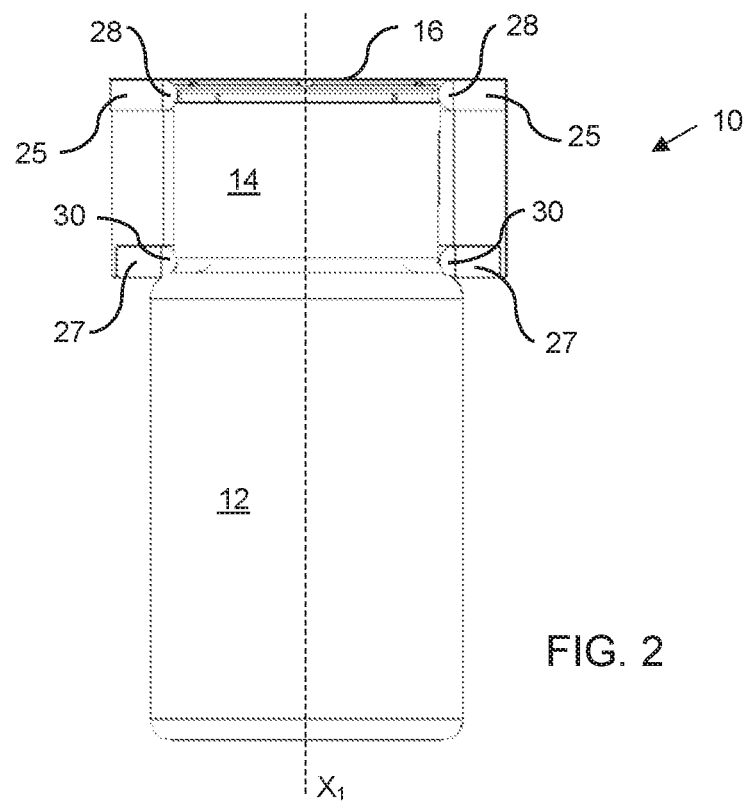
FIG. 2 is front elevation view of a final fill container and a holding fixture of the vial washing system shown in FIG. 1.

Reference will now be made in detail to embodiments of the invention, examples of which are illustrated in the accompanying drawings. The terminology used in the description of the invention herein is for the purpose of describing particular embodiments only and is not intended to be limiting of the invention.

The following description is directed towards various embodiments of a vial washing device and method in accordance with the present invention.

Referring to the drawings in detail, where like numerals indicate like elements throughout, there is shown in FIGS. 1-6 embodiments of a vial washing device and method.

A final fill container 10 may include a vial 12 comprised of a glass, ceramic, or polymeric material. The vial 12 may have a cylindrical lower part having a general longitudinal axis $X_1$ and may have a neck at the upper part terminating into a lip defining an opening therein. During a pharmaceutical processing operation, the inside of the vial 12 may be filled with a medicament (not shown). The vial 12 with the medicament contained therein may undergo a lyophilization process, in which the medicament is subjected to a vacuum to remove moisture. During lyophilization, the stopper may be partially positioned within the opening of the vial 12 or it may be placed such that it may be readily inserted into the opening of the vial 12 to form an air-tight seal. After the medicament has been lyophilized and while under vacuum, the opening of the vial 12 is sealed with the stopper. Additionally, either before or after lyophilization, a cylindrical shell 14 having a button 16 may be placed in a position aligned collinearly with the longitudinal axis of the vial and circumscribing the lip and the stopper.

After the lyophilization, the final fill container 10 may be transported to a wash 40 with one or more sprayers 44 where it can be washed to remove any residue that may have formed during lyophilization. The final fill container 10 may be transported with one or more transport mechanisms, such as a horizontally oriented conveyer belt 42. The transport mechanisms may also or alternatively include a helical screw (not shown), robotic arm (not shown) or other mechanisms known to those skilled in the art. The final fill container 10 may also be transported by a pair of rigid support structures 20 (collectively referred to as a holding fixture). The rigid support structures 20 may be comprised of any rigid material, such as a rigid plastic or a metal, for example.

Figure 3:
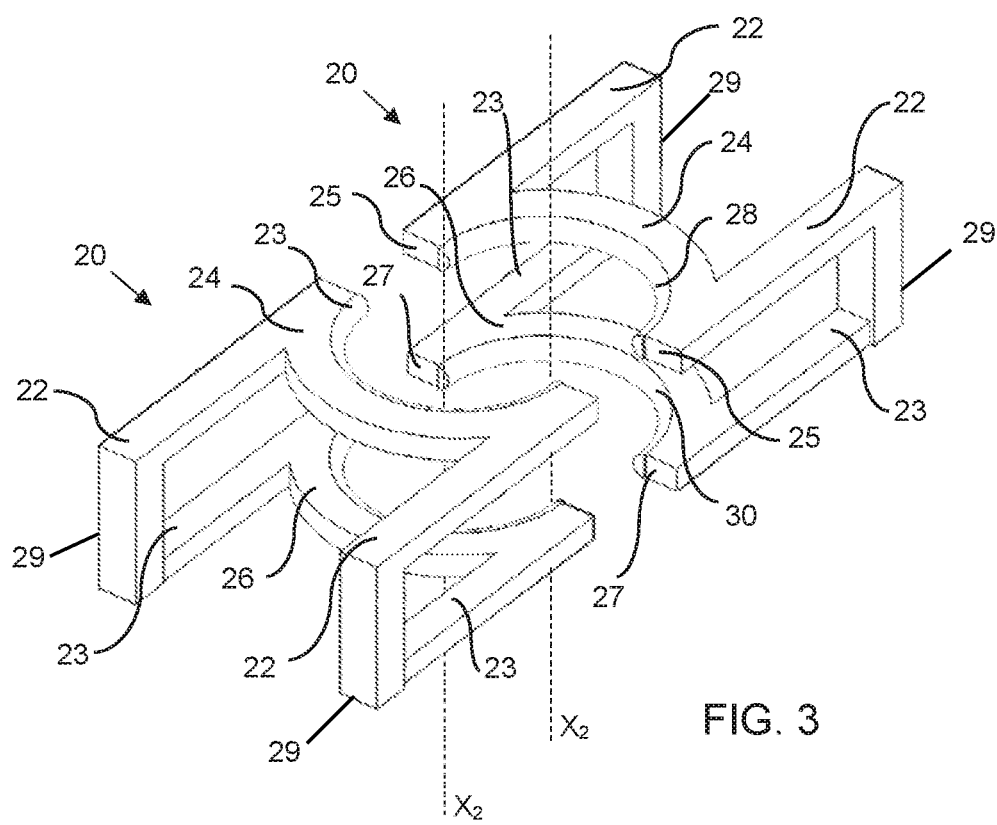
FIG. 3 is a perspective view of a pair of holding fixtures shown in FIG. 1.
Figure 4:
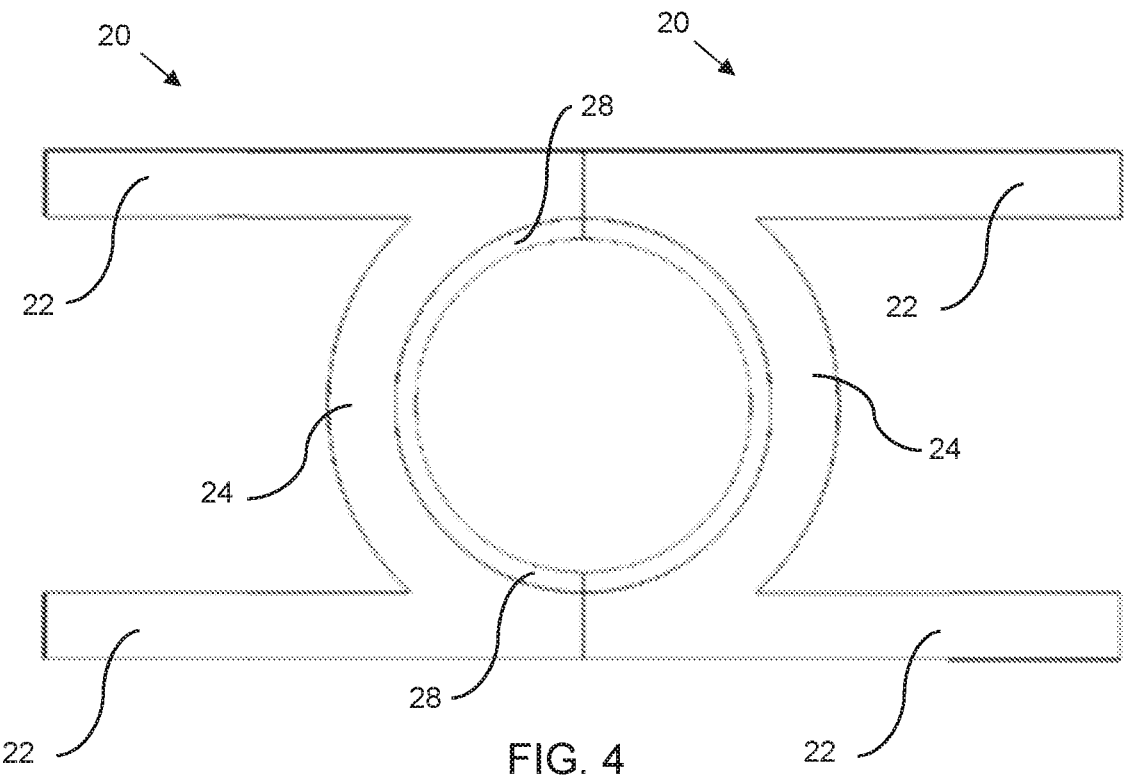
FIG. 4 is a top elevation view of the pair of holding fixtures shown in FIG. 3.

As shown in FIG. 3, the rigid support structure 20 may include a first inner support 24 having a curved first inner surface 25 which faces radially inward. In a preferred embodiment, the first inner support 24 is semi-circular shaped and the first inner surface 25 is a cylindrical wall spanning a 180-degree arc having a radius of curvature about a second longitudinal axis $X_2$. The rigid support structure 20 may also include a second inner support 26 spaced axially apart from the first inner support 24. The second inner support 26 may have a curved second inner surface 27 which faces radially inward. In a preferred embodiment, the second inner support 26 is semi-circular shaped and the second inner surface 27 is a cylindrical wall spanning a 180-degree arc having a radius of curvature about a second longitudinal axis $X_2$. The first and second inner surfaces 25, 27 have different radii of curvature, however, in other embodiments the radius of curvature is the same for both.

The rigid support structure 20 may have at least one first support arm 22 connected to the first inner support 24 and extending in an outward direction away from the first inner surface 25. In a preferred embodiment, the rigid structure 20 includes two first support arms 22 connected to the first inner support 24 at opposite ends and being parallel to one another. The rigid support structure 20 may also have at least one second support arm 23 connected to the second inner support 26 and extending in an outward direction away from the second inner surface 27. In a preferred embodiment, the rigid structure 20 includes two second support arms 23 connected to the second inner support 26 at opposite ends and being parallel to one another. The at least one first support arm 22 and the at least one second support arm 23 may have a different geometry from one another or they may be the same.

Figure 5:
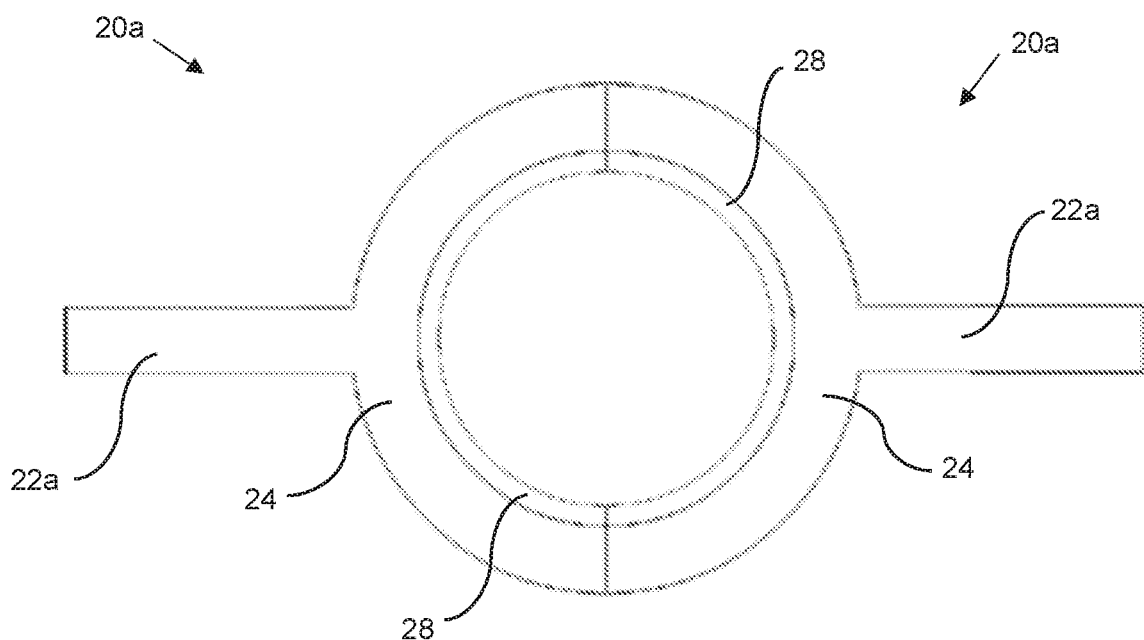
FIG. 5 is a top elevation view illustrating another exemplary embodiment of a pair of holding fixtures.
Figure 6:
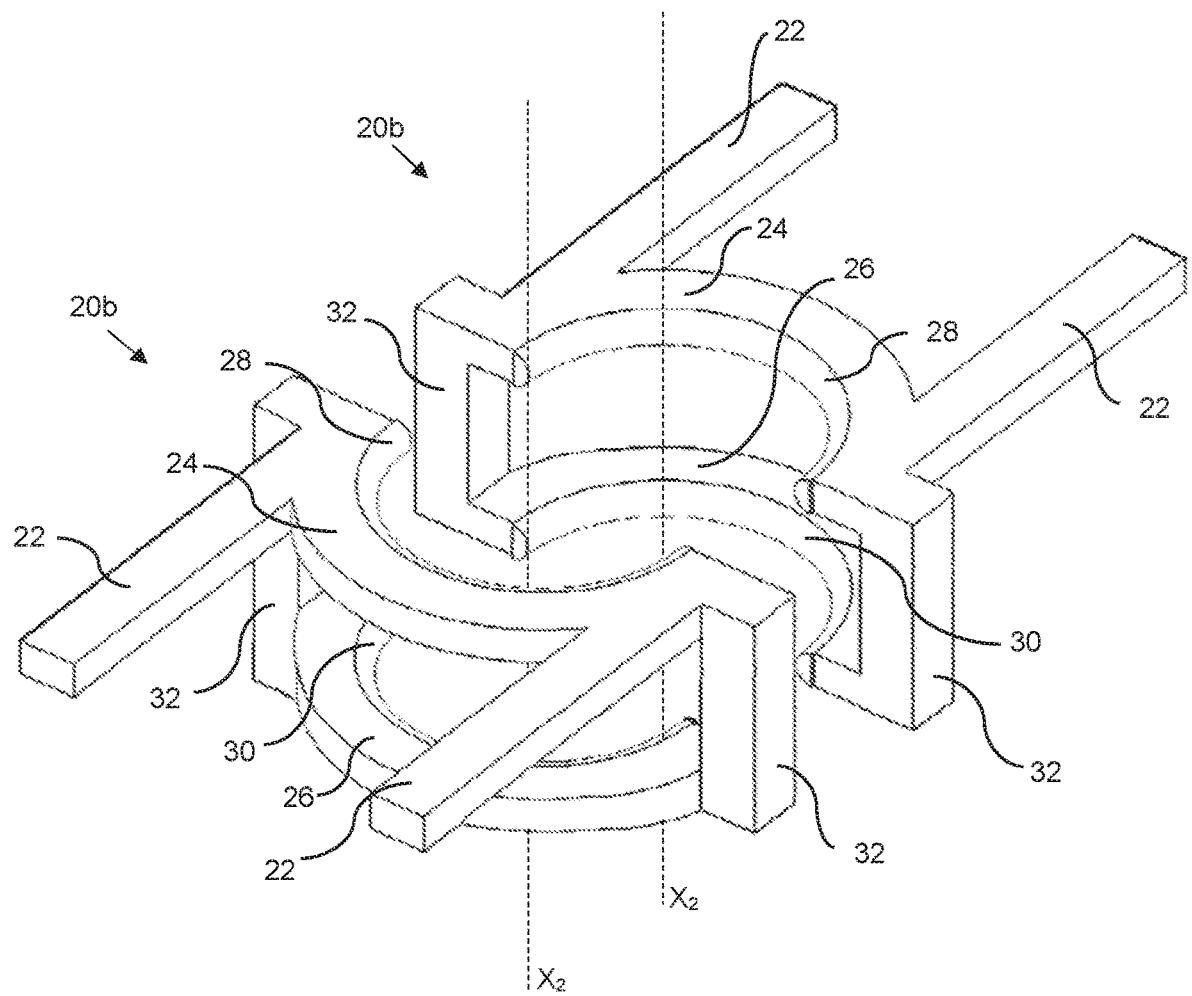
FIG. 6 is a perspective view illustrating another exemplary embodiment of a pair of holding fixtures.

In another embodiment shown in FIG. 5, a rigid support structure 20a includes only one first support arm 22a connected to the median of the first inner support 24. It may also include only one second support arm (not shown) connected to the median of the second inner support 26 (not shown). In another embodiment shown in FIG. 6, a rigid support structure 20b includes two first support arms 22 connected to the first inner support and two axially oriented support arms 32 connecting the first inner support 24 to the second inner support 26. Moreover, the support arms 32 are positioned radially outward from the first and second inner supports to permit washing along an uncovered annular surface of the shell 14.

The rigid support structure 20 may also include a first compression member 28 attached to the first inner surface 25 and a second compression member 30 attached to the second inner surface 27. The first and second compression members 28, 30 may be comprised of any compressible material such as an elastomer or soft plastic. Moreover, the first and second compression members 28, 30 may be cylindrically-, toroidally-, half-toroidally-, or irregularly-shaped. In a preferred embodiment, the first and second compression members are half-toroidally-shaped, i.e. a toroid split along its equatorial plane. The first and second compression members may be sized appropriately to conform to one or more surfaces or edges on the vial 12, the shell 14, or the button 16. In a preferred embodiment, the first compression member 28 is sized to conform with an edge or surface of the shell 14 and an edge or surface of the button 16, such that any gap therebetween is shielded from a washing operation. The second compression member 30 is sized to conform with an edge or surface of the shell 14 and an edge or surface of the vial 12. For similar purposes, any gap therebetween is shielded from a washing operation. The first and second compression members 28, 30 may have an arc-length longer than the arc-length of the respective first and second inner surfaces 25, 27 to allow them to compress against respective mating first and second compression members 28, 30 in a closed orientation forming combined first and second annular compression members 28, 30. Each of the first and second inner supports 24, 26 may have two free ends which terminate at abutment surfaces to abut against respective abutment surfaces from a mating rigid support member 20. Thus, the first and second compression members 28, 30 are compressed against respective first and second compression members 28, 30 when the abutment surfaces from a pair of rigid support structures 20 abut their corresponding abutment surfaces.

The at least one first support arm 22 and the at least one second support arm 23 may terminate at a base surface 29. In a preferred embodiment, each of the pairs of support arms 22, 23 terminate at base surfaces 29 connected by a bar, but one having skill in the art would appreciate that the support arms may also terminate at a single base surface (such as a base plate, not shown) or at individual base surface, i.e., a base surface for each support arm (not shown). The base surfaces 29 of the rigid support structures 20 may be attached to a right-hand side vertically oriented conveying belt 46 and to a left-hand side vertically oriented conveying belt (not shown) oppositely aligned from right-hand side vertically oriented conveying belt 46. The bases 29 may be attached by fasteners, adhesives, weave, or any other attachment mechanism known to those skilled in the art.

Both of the vertically-oriented conveying belts may rotate at the same speed and in the opposite angular direction such that they define an inner pathway 48 in which they move in the same linear direction at the same linear speed. The rigid support structures 20 may be spaced apart on each of the vertically oriented conveying belts such that a pair of rigid support structures 20 abut one another as they travel along the inner pathway 48.

During a washing operation, the rigid support structures 20 are coordinated to close around a final fill container 10 as it is being transported to the wash 40. The rigid support structures 20 pivot and translate, such that the inner and outer supports 24, 26 circumferentially enclose the top of the final fill container, i.e., the second longitudinal axes $X_2$ from each of a pair of rigid support structures 20 and the first longitudinal axis $X_1$ become aligned collinearly. In a preferred embodiment, the first annular compression members 28 compress and conform with an annular surface of the button 16 and the shell 14, covering up an annular gap formed therebetween. Likewise, the second annular compression members 30 compress and conform with an annular surface of the vial 12 and the shell 14, covering up an annular gap formed therebetween. After the first and second annular compression members 28, 30 conform with these surfaces, respective pairs of the first and second inner supports continue to move toward one another until their abutment surface abut respective abutment surfaces. At this point, the pair of rigid support structures 20 are able to support the weight of the final fill container 10 and transport it to the wash 40 along the inner pathway 48. The pair of rigid support structures 20 may then transport the final fill container 10 in front of one or move sprayers 44. The one or more sprayers 44 may spray the final fill container 10 with water or a detergent mixture to help remove residue form thereon from the lyophilization process. During the washing process, an annular surface of the shell 14 between the first and second annular compression members 28, 30, and the vial 12 below the second annular compression members 30, may be washed along an entire circumference of the annular surfaces, as these surfaces are unobstructed by the rigid support structures 20. The top of the button 16 and the remaining surfaces of the vial 12 may also be washed.

The foregoing detailed description of the invention has been disclosed with reference to specific embodiments. However, the disclosure is not intended to be exhaustive or to limit the invention to the precise forms disclosed. Those skilled in the art will appreciate that changes could be made to the embodiments described above without departing from the broad inventive concept thereof. Therefore, the disclosure is intended to cover modifications within the spirit and scope of the present invention as defined by the appended claims.

We claim:

1. A holding fixture for a final fill container comprising a vial comprising a medicament contained therein, the vial having a first longitudinal axis and a neck at a proximal end thereof, the neck proximally terminating at a circumferential lip, the lip defining an opening, the final fill container further comprising a stopper positioned at least partially within the vial opening and forming an air-tight seal with the vial, and a cylindrical shell including a button aligned with the first longitudinal axis and circumscribing the lip and the stopper, the holding fixture comprising:
   a pair of rigid support structures, each rigid support structure comprising:
      a first inner support having a first inner surface with a radius of curvature with respect to a second longitudinal axis, the first inner surface facing radially inward;
      at least one first support arm connected to the first inner support and extending in an outward direction away from the first inner surface, the at least one first support arm having a base surface at a terminal end opposite from the first inner support; and
      a first compression member attached to the first inner surface, the first compression member being configured to contact the shell at least when the first and second longitudinal axes are collinear;
   wherein the pair of rigid support structures has a closed orientation when the first compression member from one of the pair of rigid support structures contacts the first compression member from the other one of the pair of rigid support structures forming a combined first annular compression member.

2. The holding fixture according to claim 1, wherein each rigid support structure further comprises:
   a second inner support having a second inner surface with a radius of curvature with respect to a second longitudinal axis, the second inner surface facing radially inward and being spaced apart axially from the first inner surface; and
   a second compression member attached to the second inner surface, the second compression members being configured to contact the shell at least when the first and second longitudinal axes are collinear; and
      wherein, in the closed orientation, the second compression member from one of the pair of rigid support structures contacts the second compression member from the other one of the pair of rigid support structures forming a combined second annular compression member.

3. The holding fixture according to claim 2, wherein each rigid support structure further comprises at least one second support arm connected to the second inner support and extending in an outward direction away from the second inner surface, the at least one second support arm having a base surface at a terminal end opposite from the second inner support.

4. The holding fixture according to claim 2, wherein each rigid support structure further comprises at least one second support arm connected to the second inner support and the first inner support and extending axially therebetween.

5. The holding fixture according to claim 2, wherein the first radius of curvature and the second radius of curvature are different.

6. The holding fixture according to claim 2, wherein the first inner support has at least one first abutment surface and the second inner support has at least one second abutment surface; and
wherein the at least one first abutment surface and the at least one second abutment surface from each of the pair of rigid support structures are configured to contact the respective at least one first abutment surface and the respective at least one second abutment surface when the second longitudinal axis from each of the pair of rigid support structures are collinear.

7. The holding fixture according to claim 6, wherein the first and second compression members from one of the pair of rigid support structures is configured to contact the respective first and second compression members from the other one of the pair of rigid support structures while the at least one first abutment surface and the at least one second abutment surface from each of the pair of rigid support structures are in contact with the respective at least one first abutment surface and the respective at least one second abutment surface and while the at least one first abutment surface and the at least one second abutment surface from each of the pair of rigid support structures are not in contact with the respective at least one first abutment surface and the respective at least one second abutment surface.

8. The holding fixture according to claim 2, wherein, in the closed orientation, the holding fixture is configured to support the weight of the final fill container.

9. The holding fixture according to claim 2, wherein, in the closed orientation, the first annular compression member is configured to conform with an annular surface of the shell and an annular surface of at least one of the button and vial, and the second annular compression member is configured to conform with an annular surface of the shell and an annular surface of at least one of the button and vial which is not conforming to the button or the vial.

10. The holding fixture according to claim 9, wherein, in the closed orientation, the holding fixture is configured to hold a final fill container such that an annular surface of the shell located axially between the first and second annular compression members is unobstructed to permit washing along its entire circumference.

11. The holding fixture according to claim 10, wherein, in the closed orientation, the holding fixture is configured to hold a final fill container such that at least a portion of the top is exposed to permit washing thereof.

12. The holding fixture according to claim 1, wherein the at least one first support arm includes two first support arms extending parallel to one another.

13. The holding fixture according to claim 1, wherein the base surface is configured to be attached to a vial transport device.

14. The holding fixture according to claim 1, wherein the first inner support has at least one first abutment surface; and
wherein the at least first one abutment surface from each of the pair of rigid support structures are configured to contact one another when the second longitudinal axis from each of the pair of rigid support structures are collinear.

15. The holding fixture according to claim 14, wherein the first compression member from one of the pair of rigid support structures is configured to contact the first compression member from the other one of the pair of rigid support structures while the at least one first abutment surface from each of the pair of rigid support structures are in contact with each other and while the first at least one abutment surface from each of the pair of rigid support structures are not in contact with each other.

16. The holding fixture according to claim 1, wherein, in the closed orientation, the first annular compression member is configured to conform with an annular surface of the shell and an annular surface of at least one of the button and vial.

17. The holding fixture according to claim 1, wherein, in the closed orientation, the holding fixture is configured to hold a final fill container such that at least a portion of the top is exposed to permit washing thereof.

18. A method for washing a final fill container comprising a vial comprising a medicament contained therein, the vial having a first longitudinal axis and a neck at a proximal end thereof, the neck proximally terminating at a circumferential lip, the lip defining an opening, the final fill container further comprising a stopper positioned at least partially within the vial opening and forming an air-tight seal with the vial, and a cylindrical shell including a button aligned with the first longitudinal axis and circumscribing the lip and the stopper, the method comprising:
providing a pair of rigid support structures, each rigid support structure comprising:
a first inner support having a first inner surface with a radius of curvature with respect to a second longitudinal axis, the first inner surface facing radially inward;
at least one first support arm connected to the first inner support and extending in an outward direction away from the first inner surface, the at least one first support arm having a base surface at a terminal end opposite from the first inner support; and
a first compression member attached to the first inner surface, the first compression member being configured to contact the shell at least when the first and second longitudinal axes are collinear;
closing the pair of rigid support structures around the final fill container such that the first compression member from one of the pair of rigid support structures contacts the first compression member from the other one of the pair of rigid support structures forming a combined first annular compression member, the first annular compression member conforming with an annular surface of the shell and an annular surface of at least one of the button and vial;
transporting, with the holding fixture, the final fill container in front of at least one sprayer, wherein an annular surface of the shell is unobstructed to permit washing along its entire circumference and at least a portion of the top is exposed to permit washing thereof.

19. The method for washing a final fill container according to claim 18, wherein each rigid support structure further comprises:
a second inner support having a second inner surface with a radius of curvature with respect to a second longitudinal axis, the second inner surface facing radially inward and being spaced apart axially from the first inner surface; and a second compression member attached to the second inner surface, the second compression members being configured to contact the shell at least when the first and second longitudinal axes are collinear; and wherein, closing the pair of rigid support structures around the final fill container further comprises closing the rigid support structures such that the second compression member from one of the pair of rigid support structures contacts the second compression member from the other one of the pair of rigid support structures forming a combined second annular compression member.

20. The method for washing a final fill container according to claim 19, wherein during transporting, the annular surface of the shell that is unobstructed to permit washing along its entire circumference is located axially between the first and second annular compression members.

* * * * *